United States Patent
Czosnowski et al.

(10) Patent No.: US 9,366,829 B2
(45) Date of Patent: Jun. 14, 2016

(54) MULTI-FERRULE CONNECTOR FOR MULTICORE FIBER TERMINATIONS

(71) Applicants: Wladyslaw Czosnowski, Duluth, GA (US); Gregory A. Sandels, Buford, GA (US)

(72) Inventors: Wladyslaw Czosnowski, Duluth, GA (US); Gregory A. Sandels, Buford, GA (US)

(73) Assignee: OFS FITEL, LLC, Norcross, GA (US)

( * ) Notice: Subject to any disclaimer, the term of this patent is extended or adjusted under 35 U.S.C. 154(b) by 319 days.

(21) Appl. No.: 13/902,687

(22) Filed: May 24, 2013

(65) Prior Publication Data

US 2013/0259429 A1    Oct. 3, 2013

Related U.S. Application Data (63) Continuation-in-part of application No. 13/049,780, filed on Mar. 16, 2011, now Pat. No. 8,801,301, and a continuation-in-part of application No. 13/049,794, filed on Mar. 16, 2011.

(60) Provisional application No. 61/651,126, filed on May 24, 2012.

(51) Int. Cl.
    *G02B 6/38* (2006.01)

(52) U.S. Cl.
    CPC .......... *G02B 6/3879* (2013.01); *G02B 6/3885* (2013.01); *G02B 6/3851* (2013.01); *G02B 6/3871* (2013.01); *G02B 6/3893* (2013.01)

(58) Field of Classification Search
    None
    See application file for complete search history.

(56) References Cited

U.S. PATENT DOCUMENTS

| | | | | |
|---|---|---|---|---|
| 5,600,747 A * | 2/1997 | Yamakawa et al. | | 385/59 |
| 5,675,682 A * | 10/1997 | De Marchi | | 385/77 |
| 5,870,515 A * | 2/1999 | Ott et al. | | 385/59 |
| 6,146,023 A * | 11/2000 | Weigel | | 385/55 |
| 6,485,189 B1 * | 11/2002 | Gilliland et al. | | 385/59 |
| 6,547,585 B2 * | 4/2003 | Bradley et al. | | 439/353 |
| 6,705,765 B2 * | 3/2004 | Lampert et al. | | 385/77 |
| 6,857,900 B2 * | 2/2005 | Kleeberger et al. | | 439/540.1 |
| 8,858,089 B2 * | 10/2014 | Bradley et al. | | 385/60 |
| 2003/0108301 A1 * | 6/2003 | Bates et al. | | 385/59 |
| 2003/0190130 A1 * | 10/2003 | Welker et al. | | 385/126 |
| 2009/0274432 A1 * | 11/2009 | Iwaya | | 385/139 |
| 2010/0111484 A1 * | 5/2010 | Allen | | 385/135 |
| 2012/0251051 A1 * | 10/2012 | Wakjira et al. | | 385/59 |
| 2013/0044978 A1 * | 2/2013 | DeDobbelaere et al. | | 385/33 |
| 2013/0051733 A1 * | 2/2013 | Gallegos et al. | | 385/76 |
| 2014/0219609 A1 * | 8/2014 | Nielson et al. | | 385/54 |
| 2014/0233893 A1 * | 8/2014 | Mei et al. | | 385/76 |

* cited by examiner

*Primary Examiner* — Mike Stahl
(74) *Attorney, Agent, or Firm* — Jacobs & Kim LLP (57) ABSTRACT

A ganged connector housing is configured to receive a plurality of single-fiber connectors. Each connector is removably retainable at a respective location in the connector housing. Each single-fiber connector comprises a ferrule configured to receive and retain a single multicore fiber. The single-fiber connectors have a high-density packing footprint within the connector housing. Each single-fiber connector and its respective ferrule is configured to enable individual repositioning, tuning, alignment, repair or replacement of a respective multicore fiber terminated therein, independent of other optical fibers within the plurality of single fiber ferrules, and without requiring replacement of the entire set of multicore fibers.

4 Claims, 6 Drawing Sheets

MULTI-FERRULE CONNECTOR FOR MULTICORE FIBER TERMINATIONS

CROSS REFERENCE TO RELATED APPLICATIONS

The present application claims the priority benefit of U.S. Provisional Patent Application Ser. No. 61/651,126, filed on May 24, 2012, which is owned by the assignee of the present invention, and which is incorporated herein by reference in its entirety.

The present application is a continuation-in-part of the following co-pending patent applications:

"Simplex Connectors For Multicore Optical Fiber Cables" U.S. patent Application Ser. No. 13/049,780, filed on Mar. 16, 2011, published on Sep. 22, 2011, as United States Application Publication No. 2011/0229085; and "Multifiber Connectors For Multicore Optical Fiber Cables," U.S. patent application Ser. No. 13/049,794, filed on Mar. 16, 2011, published on Sep. 22, 2011, as United States Application Publication No. 2011/0229086, both of which claim the priority benefit of U.S. Provisional Patent Application Ser. No. 61/314,165, filed on Mar. 16, 2010.

The above applications are owned by the assignee of the present application, and are incorporated herein by reference in their entirety.

INCORPORATION BY REFERENCE

The following patent, owned by the assignee of the present invention, is incorporated herein by reference in its entirety:

"High Density Modular Backplane Connector for Fiber Optics," U.S. Pat. No. 6,932,514, issued on Aug. 23, 2005.

BACKGROUND OF THE INVENTION

1. Field of the Invention

The present invention relates generally to the field of fiber optics, and in particular to connectors and connection techniques for multicore optical fibers.

2. Background Art

Multicore fiber (MCF) technology has the potential of greatly increasing the capacity of current optical fiber networks by allowing a plurality of optical data signals to be carried in parallel by a single fiber. Using MCFs in place of single-core fibers increases patching densities without jeopardizing optical performance or introducing fiber management issues One important technical issue to be addressed is connectorization, i.e., how to suitably terminate MCF cables with mating connectors that can be easily joined together, while maintaining proper alignment between the respective individual cores of the fibers being connected together.

In a typical fiber-optic transmission system, it is commonly necessary to provide multifiber connectivity, i.e., terminating a plurality of individual fibers in a single connector. Multifiber connectors, such as the MT-type connector, have been developed for use with single-core fibers. Such connectors typically comprise a single ferrule with an array of capillaries into which a corresponding set of fibers is installed.

However, the use of prior multifiber connectors to terminate a set of MCFs is problematic. Because of the lack of easy tuning and positioning of the cores of individual MCFs as well as the lack of a way to easily replace individual dark channels, it is difficult and costly to use current MT-type connectors for MCFs. Further, manipulating individual fibers for multicore alignment Is difficult, if not impossible, given that the typical center-to-center spacing between adjacent fibers is on the order of 250 μm. In addition, some MCFs are provided with a helically twisted core configuration, thus making pre-alignment solutions are difficult to implement.

SUMMARY OF THE INVENTION

An aspect of the invention provides a multifiber connector for terminating a set of multicore fibers. A ganged connector housing is configured to receive a plurality of single-fiber connectors. Each connector is removably retainable at a respective location in the connector housing. Each single-fiber connector comprises a ferrule configured to receive and retain a single multicore fiber. The single-fiber connectors have a high-density packing footprint within the connector housing. Each single-fiber connector and its respective ferrule is configured to enable individual repositioning, tuning, alignment, repair or replacement of a respective multicore fiber terminated therein, independent of other optical fibers within the plurality of single fiber ferrules, and without requiring replacement of the entire set of multicore fibers.

DETAILED DESCRIPTION

The present invention is directed to a multifiber connector design for multicore fibers (MCFs), in which a plurality of individual single-fiber connectors or connector elements are packed into a "ganged" connector housing, so as to have a high-density packing footprint. As used herein, the term "high-density packing footprint" refers to a packing configuration in which the distance between neighboring connectors is minimized, so as to achieve a highly efficient use of space. The structures and techniques described herein provide easy-to-use and economical solutions to the tuning, positioning, and channel replacement issues described above.

In an exemplary practice of the invention, each individual MCF in a set of MCFs is terminated with a respective single-fiber connector. The single-fiber connectors are then stacked and loaded into a "ganged" housing that functions as a single multifiber connector unit, in which the MCF endfaces all lie in the same plane and have a precise geometrical relationship with each other and with the housing exterior.

According to a further aspect of the invention, a ganged adapter provides core-aligned connectivity between a first set of MCFs installed into a first ganged housing and a second set of MCFs installed into a matching second ganged housing. Alternatively, a ganged adapter according to the invention can be configured to provide core-aligned connection between a set of MCFs installed into a first ganged housing and a corresponding array of suitable optical devices, such as vertical-cavity surface-emitting lasers (VCSELs) and the like.

It will be appreciated that because each MCF is terminated at a separate, individual single-fiber connector, the core alignment of each MCF can be fine-tuned independently. In addition, individual MCFs can be replaced without having to replace the other MCFs.

It will further be understood that the aspects of the invention described herein can be combined with other structures and techniques for aligning and otherwise managing optical fibers that are terminated in either single-fiber or multifiber connectors. Such structures and techniques are described, for example, U.S. patent application Ser. No. 13/049,780, and U.S. patent application Ser. No. 13/049,794, of which the present application is a continuation-in-part, and which, are incorporated herein by reference in their entirety.

Exemplary Multicore Fiber (MCF)

Figure 1A:
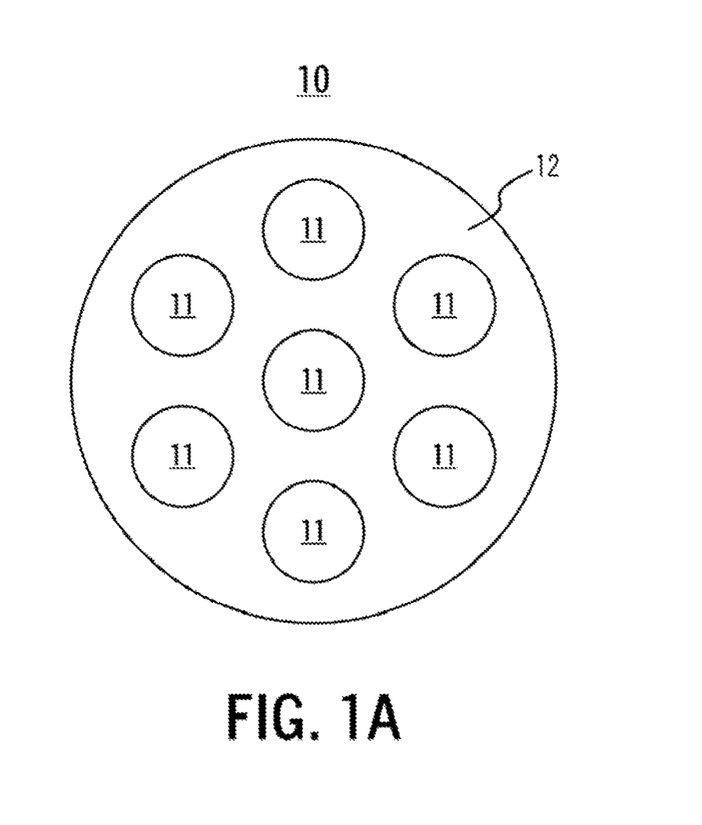
FIGS. 1A and 1B show, respectively, endface and perspective views of an exemplary multimode multicore fiber.
Figure 1B:
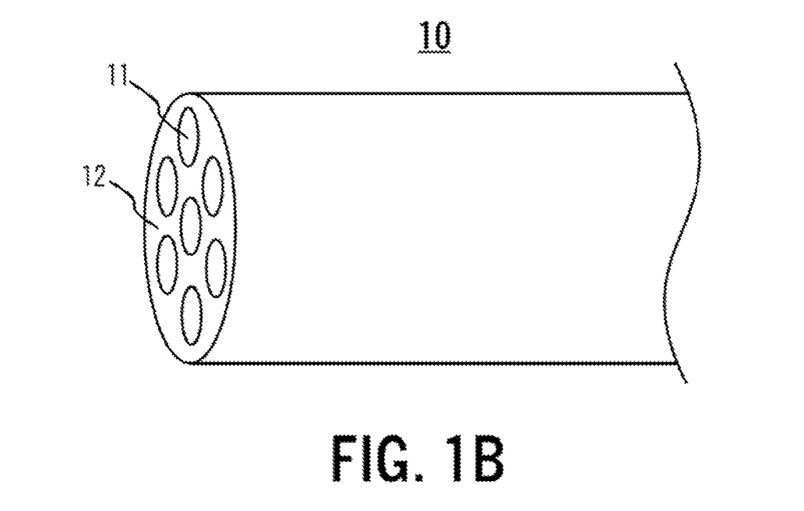

FIGS. 1A and 1B show, respectively, endface and perspective views of an exemplary multimode MCF 10, described in detail in U.S. patent application Ser. No. 13/045,064, which, is owned by the assignee of the present application and which is incorporated herein by reference in its entirety.

Aspects of the invention are described with respect to MCF 10. However, it will be appreciated that the present invention may also be practiced using other types of MCFs, including MCFs having different numbers of cores, a different types of cores or claddings, and different core configurations.

MCF 10 comprises seven graded-index cores 11, produced from seven graded-index LaserWave fiber core rods using a stack-and-draw process. The cores are arranged in a hexagonal array including a center core and six outer cores that extend through a shared cladding 12. The diameter of each of the cores is ~27 µm, and the core pitch is ~37 µm. The cladding diameter is 125 µm and the acrylate dual coating layer (not shown) is 250 µm.

When connecting a segment of MCF 10 to a second MCF segment care must be taken to ensure precise alignment for each of the MCF cores. Failure to achieve proper alignment can result in unacceptably high levels of insertion loss.

It is further noted that MCF 10 can be fabricated using a "twisted-core" configuration, in which the outer MCF cores are helically twisted around the center core. A twisted-core MCF is particularly problematic because the cross-sectional, rotational orientation of the cores varies as a function of axial position. Trimming and polishing the lead end of a twisted-core MCF causes a rotational migration of the fiber cores. Thus, even if a twisted-core MCF is precisely aligned using a "pre-alignment" technique, the rotational alignment of the MCF will typically need to be fine-tuned after the final trim and polish.

Single-Fiber Connector

According to an aspect of the invention, a set of MCFs is terminated with a corresponding set of single-fiber connectors, where each individual MCF being installed into a respective individual single-fiber connector, s is used to terminate each MCF in a given set of MCFs.

Aspects of the invention are described with respect to a set of LC-type connectors. However, it will be appreciated that the invention may be practiced with, other types of connectors having different shapes and configurations.

Figure 2:
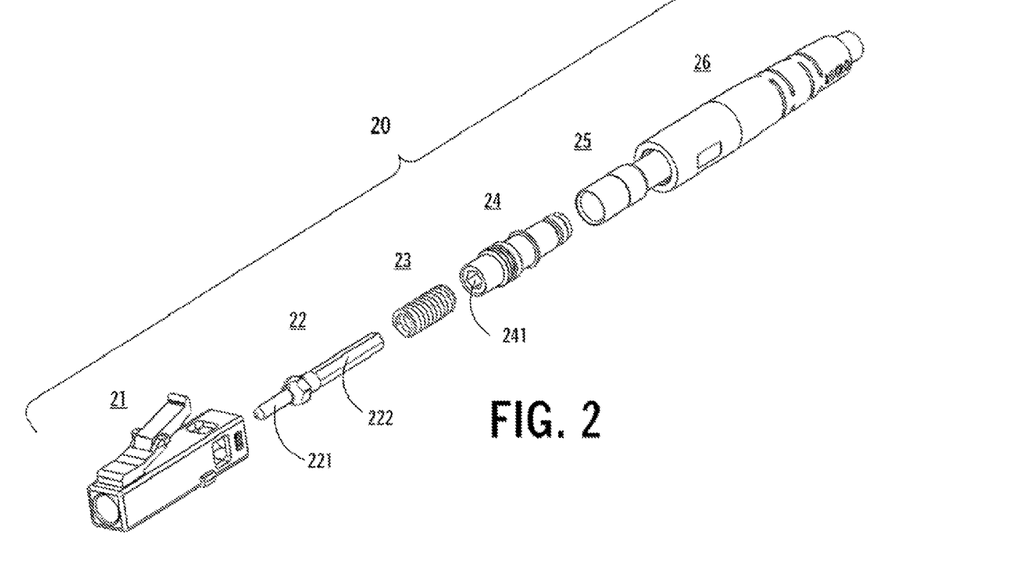
FIGS. 2 and 3 show, respectively, exploded and assembled perspective views of a modified LC-type single-fiber connector.
Figure 3:
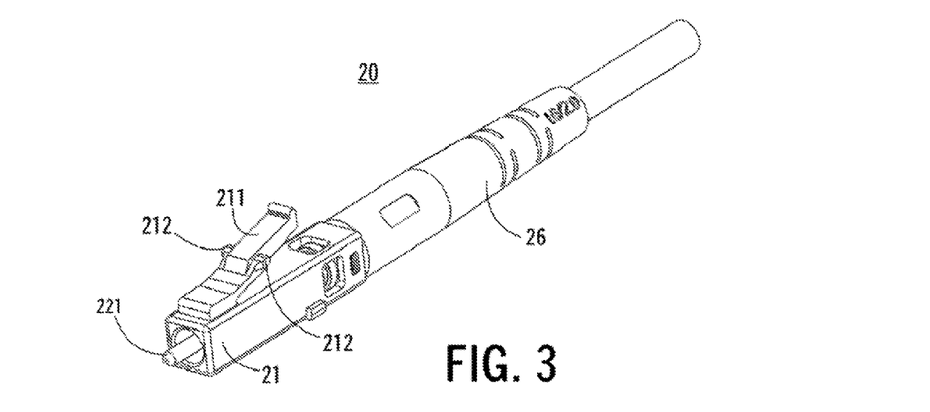

FIGS. 2 and 3 show, respectively, exploded and assembled perspective views of a modified LC-type single-fiber connector 20 that provides single-fiber connectorization for an MCF, such as MCF 10 or the like. Connector 20 has been modified in order to provide rotational alignment for the cores of an MCF, and is described in detail in U.S. patent application Ser. No. 13/049,780, of which the present application is a continuation-in-part, and which is incorporated herein by reference in its entirety.

As shown in FIG. 2, connector 20 comprises: plug housing 21, with latching arm 211 and latching shoulders 212; ferrule subassembly 22; spring 23; cable-retention rotatable extender 24 with, opening 241; crimp/sleeve subassembly 25; and strain-relief boot 26.

The plug housing 21 has a generally square outer perimeter, with a flat bottom face, and flat side faces. The top face of the housing is provided with a resilient latching arm 211 and latching shoulders 212. As discussed below, the shape of the plug housing 21 allows a plurality of connectors to be densely packed into a stable configuration, in which each connector is at least partially supported by one or more neighboring connectors, it will be appreciated that similar results can be achieved using other connector housing shapes.

Ferrule subassembly 22 comprises a single-fiber ferrule 221 and an a ferrule extension member 222. An MCF is installed into a capillary that extends down the longitudinal axis of ferrule 221 between its base and its tip. During installation, the lead end of an MCF segment is threaded through the capillary, with a portion of the MCF extending beyond the ferrule tip. The MCF can then be pre-aligned within the ferrule tip and then epoxied into place.

After the epoxy has been cured, the MCF is trimmed and polished to leave an exposed endface at the tip of ferrule 221. When the connector is fully assembled, the tip of ferrule 221 extends a short distance out of the lead end of the connector housing 21. Spring 23 provides spring-loading of the ferrule subassembly 22 relative to the plug housing 21. When two matching ferrule tips are connected to each other, the spring-loading causes the ferrule lips to be pressed towards each other in order to assure firm physical contact between the respective fiber endfaces.

FIG. 3 shows a perspective view of connector 20, after assembly. With the crimp/sleeve subassembly 25 and strain-relief boot 26 permanently installed, the fiber cores can be oriented relative to the latch arm 211 on the plug housing 21 by rotating the boot 26 relative to the housing 21. Once the cores are in the desired orientation, the rotatable extender 24 can be fixed relative to the housing 21 using epoxy or other suitable means.

As noted above, other types of single-fiber connectors can be employed in conjunction with the structures and techniques described herein.

Ganged Housing

Figure 4:
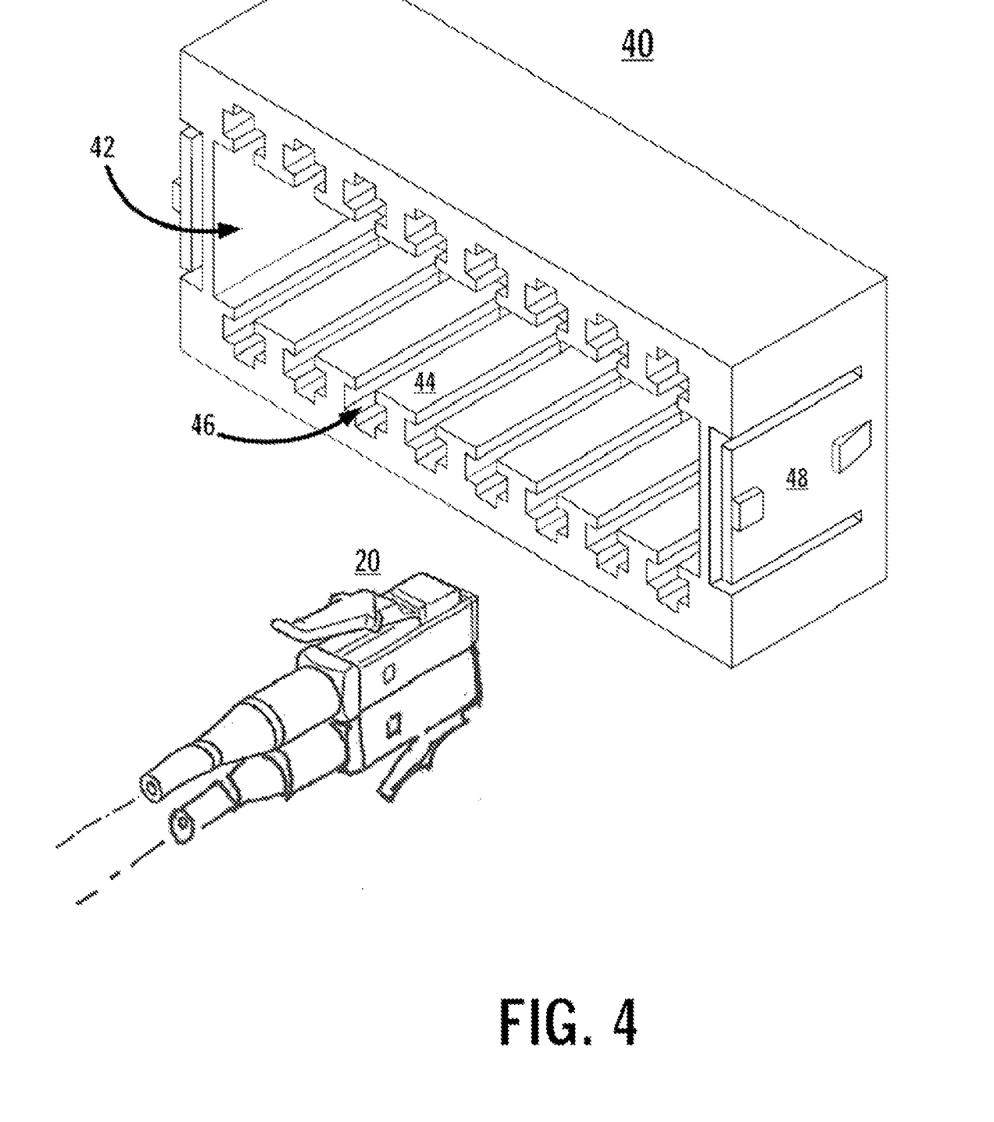
FIG. 4 shows an isometric view of a ganged housing according to an aspect of the invention for combining a plurality of individual connectors into a single multifiber connector structure.
Figure 5:
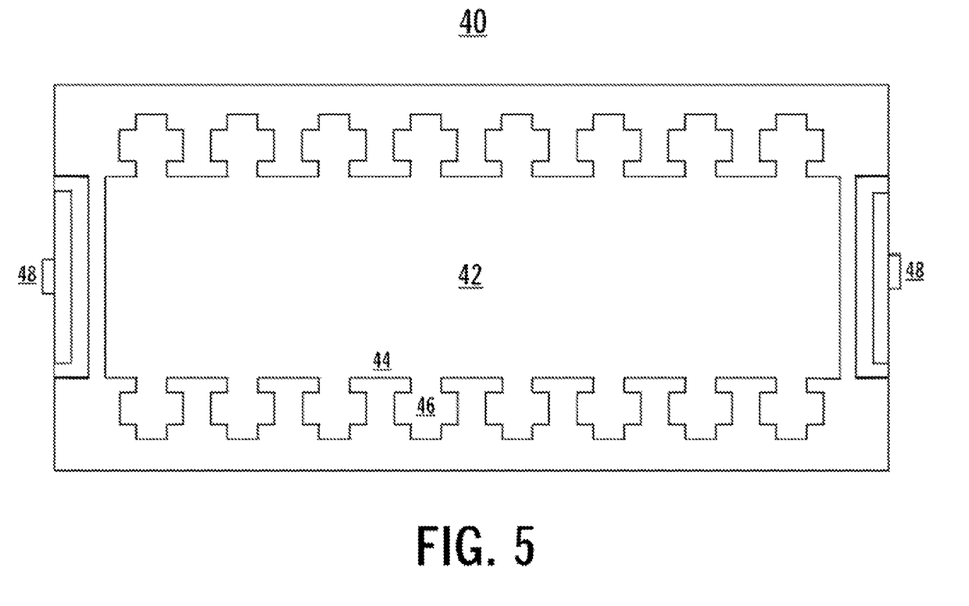
FIG. 5 shows a diagram shows a from view of the ganged housing shown in FIG. 4.

FIGS. 4 and 5 show, respectively, isometric and front views of a "ganged" housing 40 according to an aspect of the invention. The function of housing 40 is to combine a plurality of individual connectors into a single multifiber connector structure with a high-density packing footprint, thereby providing space-efficient multifiber connectivity for a plurality of individually connectorized MCFs.

In the practice of the invention depicted in FIG. 4, housing 40 is configured to receive a plurality of the above-described connectors 20 arranged in a closely-packed stack, in which individual connectors butt up against each other. Housing 40 provides support at the outer perimeter of the stack and does not employ any internal supporting structures.

Housing 40 comprises a hollow rectangular body with a single aperture 42 extending between a front face and a rear face. Aperture 42 is configured to closely receive a stacked array of single-fiber connectors. In the depicted example, aperture 42 is shaped to receive a rectangular connector array comprising 16 single-fiber connectors of the type shown in FIGS. 3 and 4, arranged in 2 rows and 8 columns.

Connectors 20 are loaded into the housing 40 in pairs, each connector pair forming one column of the 2×8 array. Each connector pair comprises an upper connector and a lower connector that are respectively rotated and otherwise positioned to line up with each other with their bottom, surfaces abutting each other, and with the respective latching arms of the two connectors at the top and bottom of the two-connector stack.

Figure 6:
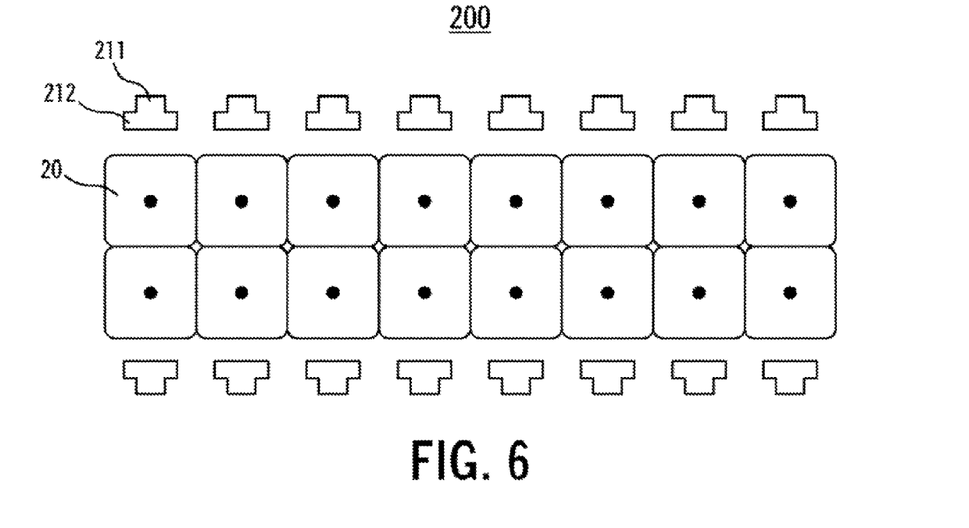
FIG. 6 shows a diagram illustrating the configuration of a 2×8 connector array that is installable into the ganged housing shown in FIG. 5.

FIG. 6 shows a diagram illustrating the 2×8 connector array 200. Individual MCFs are represented by black dots at the center of each connector. When the connectors are fully loaded into the housing, the individual MCF endfaces all lie in the same plane, within tolerance, and are accessible through the open rear face of the housing.

It is noted that the number and arrangement of the connectors in the connector array, as well as the terms "upper" and "lower" have been arbitrarily chosen to illustrate aspects of the invention. The present description also applies to other stack configurations and rotational orientations.

The upper and lower inner housing walls are provided with respective sets of parallel rails 44. Each set of rails defines a set of parallel slots 46 for receiving a respective connector latching arm 211, and is configured such that as a connector is loaded into the housing, its latching arms is gradually depressed toward the body of the plug housing 21. Each latching slot 46 is further shaped such that when the connector 20 reaches its final installed position, the resilience of the latching arm causes it to be urged away from the body of the plug housing, causing the latching shoulders to be engaged by a contact surface lying across the path traveled by the connector, thereby locking the connector in place. Each connector 20 can be released from its slot 46 by manually depressing its latching arm 211, causing the latching shoulders 212 to become disengaged from the contact surface.

The ganged housing aperture 42 fits closely around the stacked connectors 200. Thus, when the housing 40 is fully loaded, each connector 20 is supported by a neighboring connector and by the inner housing walls. By configuring the connectors and housing in this way, it is possible to achieve a stable structure without the need for an interior shelf or like structure to separate the two rows of connectors. Individual connectors are relatively easy to load and remove, but are held firmly in place when locked into position.

When a stacked connector pair is inserted into the housing aperture, it is guided into position by the structural interaction between the corresponding upper and lower latching slots 44 and the upper and lower latching arms 121. Each stacked connector pair may also be guided, in part, by connector pairs that have been Installed previously. When all of the connectors are in place, the width of the connector array is equal, within tolerance, to the width of the housing aperture, thus preventing lateral movement of the connectors.

The ganged housing 40 further includes deflectable side clips 48 for locking the housing into an adapter, or like structure, such as the ganged adapter described in the next section.

Ganged Adapter

Figure 7:
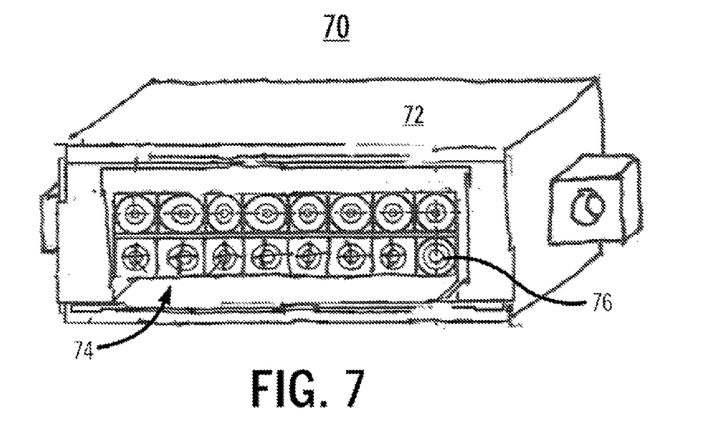
FIG. 7 shows an isometric view of a ganged, adapter for use with the ganged housing shown in FIGS. 4 and 5.
Figure 8:
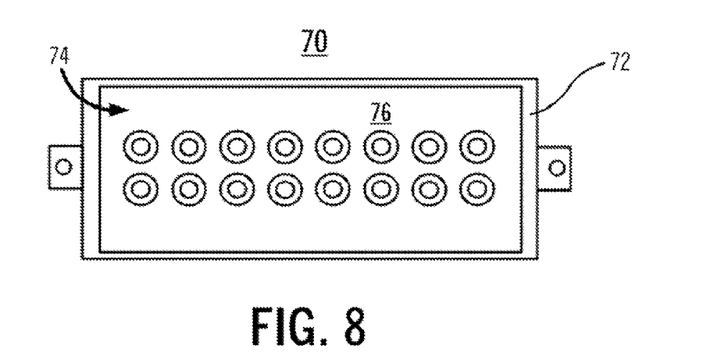
FIG. 8 is a front side view of the ganged adapter shown in FIG. 7.

FIGS. 7 and 8 show, respectively, isometric and elevation views of a ganged adapter 70 for use with the ganged housing shown in FIGS. 4 and 5. In the depicted example, the ganged adapter 70 is used to connect together a first plurality of MCFs terminated in a first ganged housing 40 and a corresponding second plurality of MCFs terminated in a second ganged housing. It will be appreciated that the described structures and techniques can be modified for providing connectivity, for example, between a plurality of MCFs terminated in a ganged housing 40 and a suitably configured array of optical devices.

Ganged adapter 70 comprises an adapter body 72 with a first opening 74 at a first face and a second opening at a second face, opposite the first face. In the present example, the first and second openings are configured to receive matching first and second housings and have the same shape. However, it will be appreciated that the two openings can be configured to have different shapes for use in a given application.

The first and second openings are separated from each other by an array of mating sleeves that provide alignment for the respective connector ferrules. The sleeves can be integrally formed in the ganged housing. Alternatively, the mating sleeves, or portions, thereof can be fabricated separately and assembled into the ganged housing.

Figure 9:
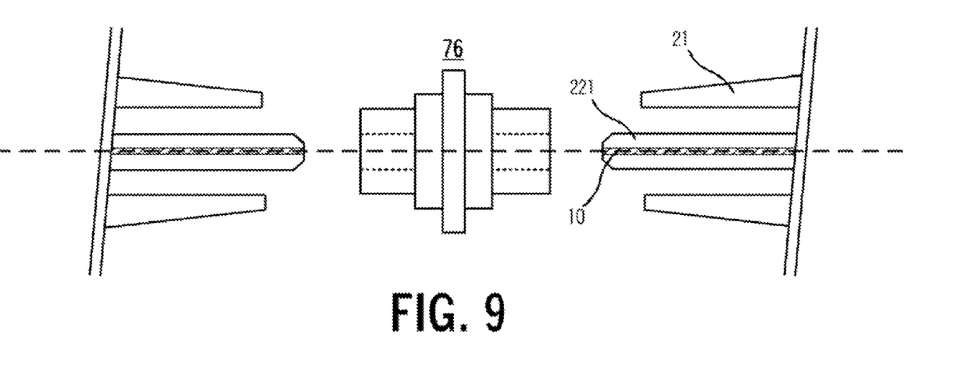
FIG. 9 shows a side view of a mating sleeve and the lead ends of a pair of matching single-fiber connectors.

FIG. 9 is a side view of a mating sleeve 70 and the lead ends of a pair of matching connectors. A ferrule tip 221 extends out of the ends of each connector 20 and contains the endface of a respective MCF 10. Mating sleeve 70 has a hole extending down its length with a first end for receiving the first ferrule and a second end for receiving the second ferrule.

As noted above, the connector ferrules are spring-loaded. Thus, each ferrule is configured to extend a short distance beyond the contact point. When the ferrules are fully installed, into the mating sleeves, the ferrule tips butt up against each other. The contact between opposing ferrules causes a compression of the connector springs. The resilience of the springs results in a small force along the longitudinal axis of the two ferrules, urging the respective MCF endfaces towards each other, to ensure a firm physical connection.

Figure 10:
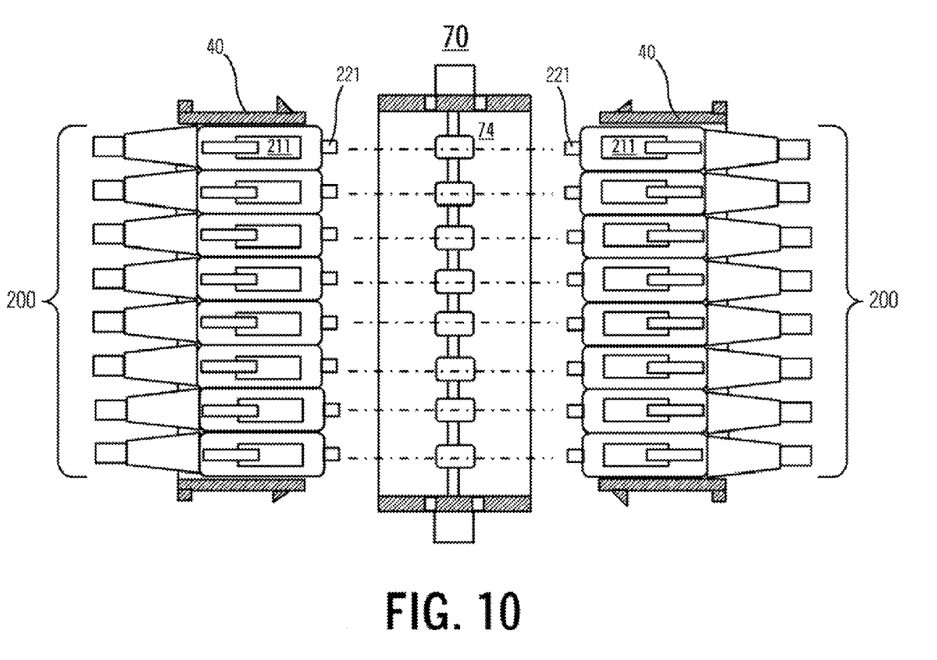
FIGS. 10 and 11 show, respectively, plan and side views of the ganged adapter and a pair of matching ganged housings.
Figure 11:
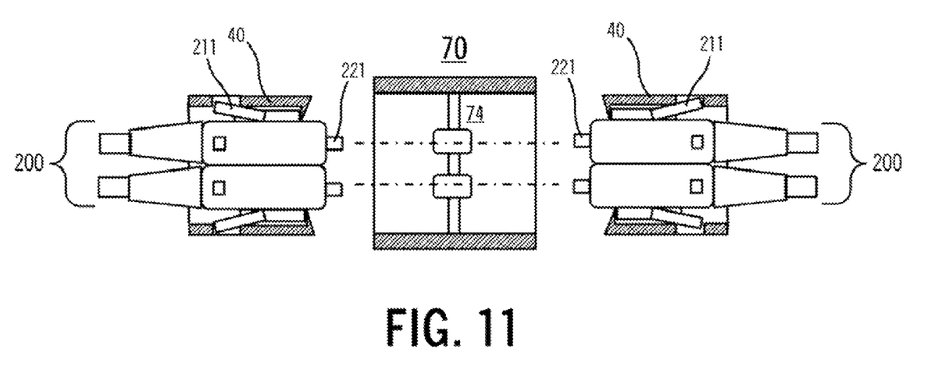

FIGS. 10 and 11 show, respectively, plan and side views of the ganged adapter 70, and a pair of matched ganged housings 40. Each ganged housing 40 is inserted into its respective opening, with each connector ferrule being inserted into a respective mating sleeve. The housings 40 are pressed inward until the locking tabs at the sides of each housing engage corresponding holes in the sides of the ganged adapter. When the ganged housings are fully inserted and locked into position, all of the respective MCF endfaces are in core-aligned contact with each other.

CONCLUSION

As described above, using ganged single ferrule single fiber connectors allow for the individual MCFs to be timed accurately and consistently, independently of the adjacent fibers. After an MCF is permanently installed into a single fiber ferrule, it can be further fine-tuned and positioned. Fibers in a ganged single fiber connector grouping can be individually optimized for performance and position in its individual termini, unlike multifiber ferrule connectors which do not allow for such optimizations. Further, a bad fiber or path can be repaired or replaced independently of the adjacent fibers, unlike multifiber ferrule connectors in which all fibers must be processed and reprocessed as a group.

It is further noted that a connector according to the present invention can be used in conjunction with structures and techniques for aligning fibers in a multifiber ferrule. Such structures and techniques are described in detail, for example U.S. patent application Ser. No. 13/049,794, of which the present application is a continuation-in-part, and which is incorporated by reference herein in its entirety.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A multifiber connector structure for terminating a set of multicore fibers, the multifiber connector structure comprising:
   a ganged connector housing, comprising an aperture shaped to closely fit around a plurality of single-fiber connectors in a stacked array, each connector being removably retainable at a respective location in the connector housing,
   wherein each single-fiber connector comprises a housing containing a ferrule for receiving and retaining a single multicore fiber,
   wherein the single-fiber connectors have a high-density packing footprint within the connector housing, and
   wherein each single-fiber connector and its respective ferrule is configured to enable individual repositioning, tuning, alignment, repair or replacement of a respective multicore fiber terminated therein, independent of other optical fibers within the plurality of single fiber ferrules, and without requiring replacement of the entire set of multicore fibers,
   wherein the aperture is configured such that in a stacked array of single-fiber connectors, the connector surfaces in a first row abut corresponding connectors surfaces in a second row such that the first and second rows support each other, and
   wherein the aperture is configured to have upper and lower latching slots to receive resilient latching arms at one side of each of the single-fiber connectors.

2. The connector of claim 1, wherein each individual ferrule can be selectively and adjustably positioned within a respective receptacle in the connector housing.

3. The connector of claim 2, wherein each single-fiber connector is configured to provide for rotational alignment of a multicore fiber installed into the ferrule therein.

4. A ganged adapter for providing connectivity between first and second ganged housings according to claim 1, wherein the ganged adapter comprises:
   an adapter body with a first opening at a first face and a second opening at a second face,
   wherein the first and second openings are configured to receive respective first and second ganged housings according to claim 1, into each of which is installed a respective stacked array of single-fiber connectors, each terminating a respective multicore fiber, and
   wherein the adapter body is configured such that when the first and second ganged housings are loaded into the first and second openings of the ganged adapter, the cores of the multicore fibers contained in the first ganged housing are brought into aligned contact with corresponding cores contained in the second ganged housing, and
   wherein the ganged adapter further comprises an array of mating sleeves between the first and second openings, wherein each mating sleeve is configured to receive a pair of connector ferrules, comprising a connector ferrule from the first ganged housing and a respective connector ferrule from the second ganged housing.

* * * * *